United States Patent [19]
Chung et al.

[11] Patent Number: 5,734,821
[45] Date of Patent: Mar. 31, 1998

[54] METHOD AND APPARATUS FOR A DIRECT DATA TRANSMISSION BETWEEN A COMMUNICATION NETWORK INTERFACE AND A MULTIMEDIA DATA PROCESSOR

[75] Inventors: Ha Jae Chung; Joon Young Heo; Bae Wook Park; Du Hyun Kim, all of Taejon-shi, Rep. of Korea

[73] Assignee: Electronics and Telecommunications Research Institute, Taejon-shi, Rep. of Korea

[21] Appl. No.: 762,434

[22] Filed: Dec. 9, 1996

[30] Foreign Application Priority Data

Jul. 12, 1995 [KR] Rep. of Korea .............. 95-47431

[51] Int. Cl.$^6$ .................................................. G06F 3/153
[52] U.S. Cl. ............................................. 395/200.3
[58] Field of Search .............. 364/DIG. 1 MS File, 364/DIG. 2 MS File; 395/501, 502, 503, 504, 200.3, 200.38, 200.42

[56] References Cited

U.S. PATENT DOCUMENTS 5,245,322 9/1993 Dinwiddie, Jr. et al. .......... 345/115
5,535,414 7/1996 Burge .................................. 395/827
5,546,547 8/1996 Bowes et al. ...................... 395/294
5,625,845 4/1997 Allran et al. ....................... 395/856

*Primary Examiner*—Robert B. Harrell
*Attorney, Agent, or Firm*—Antonelli, Terry, Stout, & Kraus, LLP

[57] ABSTRACT

The computer system comprises a hold status register for discriminating whether the data can be received from the system bus; a media analyzer for discriminating whether a media of the received data is correct; a bus snoop controller for generating an acknowledgement signal for receiving the data from the bus or for transmitting the data to the bus based on the discriminated information if the hole status register and media analyzer; and a sequence controller for multimedia data transmission for controlling the operation of the hold status register, media analyzer and bus snoop controller; and whereby the invention has an effect of reducing the load of the system bus since the data is directly transmitted through the system bus without separate data transmission path.

4 Claims, 4 Drawing Sheets

METHOD AND APPARATUS FOR A DIRECT DATA TRANSMISSION BETWEEN A COMMUNICATION NETWORK INTERFACE AND A MULTIMEDIA DATA PROCESSOR

BACKGROUND OF THE INVENTION

1. Field of the Invention

The present invention relates to a method and apparatus for a direct data transmission in which the data transmission between a communication network interface and a multimedia data processor is performed by Pre-transmission/ Post-decision & Control and, particularly to a method and apparatus for a direct data transmission between a communication network interface and a multimedia data processor which can improve the processing speed of a system by reducing a lot of load of a main instruction processor and by decreasing the number of bus use per unit multimedia data stream transmission in a computer system composed of the main instruction processor, a main memory, the multimedia data processor and the communication network interface having a system bus as a basic information exchange path.

2. Prior Art

In general, in a computer system which performs the data transmission to an external communication network through the communication network interface and in which a series of instructions to control the upper service process associated with the communication network and the flow and synchronization of the multimedia data stream are processed in the main instruction processor, all the data including the multimedia data are transmitted to the main memory device through the communication network interface and the associated instructions and data are processed in the main instruction processor.

Therefore, there are disadvantages in that a great amount of CPU times are required in the process of the multimedia data stream which has a great amount of data compared to the service size, and the efficiency of the bus usage is degraded due to the unnecessary use of bus cycle since even the multimedia data have to pass through the main memory device same as the general data do.

In addition, a series of multimedia data streams sent from the external communication network to the corresponding multimedia processor flow from the external communication network by a path composed of the communication network interface controller, system bus, main memory device, system bus, corresponding multimedia processor, auxiliary memory device or CRT terminal.

On the other hand, a series of multimedia data streams sent from the correspondent multimedia processor to the external communication network flow in the reverse path of the above described path.

As can be seen from the flow through the above described path, even the multimedia data stream the destination or source of which is the multimedia data processor has to use the bus twice to transmit the unit transmission data, whereby the load on the bus is increased and the processing speed of the main instruction processor and the multimedia data processor is decreased due to the operation associated with the request and latch of the bus use.

As described above, there is a disadvantage in that the performance speed of the entire system is decreased since additional time loss is produced at every execution of the instruction associated with the multimedia data processing.

Therefore, the system of the prior art has reduced the load of the system bus by having a separate data transmission path between the communication network interface controller and the multimedia processor.

However, hardware related to the separate data transmission path should be added for each multimedia processor due to the use of the separate data transmission path, and the data transmission can not be concurrently performed due to the difference in time of bus use between the data transmission through the system bus and that through the separate data transmission path.

Therefore, there are many problems that the load of data transmission or receiving operation of multimedia processor and communication network interface controller is not substantially reduced but the load of functions of maintain a data consistency and synchronization and the load of adding the separate data transmission path and the associated hardware are generated.

SUMMARY OF THE INVENTION

Therefore, the object of the present invention to solve the above described problems is to provide a method and apparatus for a data transmission between a communication network interface controller and multimedia data processor, which can directly transmit the data between the communication network interface controller and multimedia data process through a system bus without separate data transmission path by having a bus snoop controller, media analyzer, hold status register and sequence controller for multimedia data transmission between the communication network interface controller and multimedia data processor, by receiving and reading the data directed from the communication network interface controller to main memory device in the same cycle at the multimedia data processor and saving the data if it is valid and discarding the data if it is not valid in the receiving operation, and by making the communication network interface controller to receive and precess the data in the same way as a main instruction processor if the data is drive from the multimedia data processor to the bus in the transmission operation.

The present invention to accomplish the above described object is characterized in that in a computer system in which a communication network interface controller, multimedia processor, main main memory device, and main instruction processor, etc., can exchange information by means of a system bus, the invention comprises a hole status register for discriminating whether the data can be received from the system bus; a buffer memory for temperately storing the data to be received or transmitted; a media analyzer for discriminating whether a media of the received data is correct; a bus snoop controller for generating an acknowledgment signal for receiving the data from the bus or for transmitting the data to the bus based on the discriminated information of the hold status register and media analyzer; and a sequence controller for multimedia data transmission for controlling the operation of the hole status register, media analyzer and bus snoop controller, etc.

Another characteristics of the present invention is that in a method for direct data transmission between a communication network interface and multimedia data processor, the invention comprises of: a first step of starting a receiving operation if a state is a data receiving state and starting a transmission operation if the state is a transmission state, based on a result of check of the state of transmission or receiving of data checked by a direct transmission controller (DTC) of the multimedia data processor; a second step of reading the data on the bus if the data is available for copying, based on a result of check of a bus snoop controller according to the start of the data receiving operation of the first step; a third step of receiving the data if the operation of the bus is valid, based on a result of check of the operation state of the system bus, in succession of the performance of the second step; a fourth step of discriminating by a media analyzer whether the correspondent media is same kind when the internal buffering is possible when there is no abnormality, based on a result of check of the receiving state of the data in the third step; a fifth step of initializing the media analyzer if the corresponding media is not same kind in the fourth step, storing the received data to a buffer memory if the corresponding media is same kind; a sixth step of preparing the data to be transmitted and generating an address for transmission according to the start of transmission operation of the data in the first step; a seventh step of requesting a bus use and competing for the bus use, in succession of the performance of the sixth step; and an eighth step of driving the data to the bus if DTC wins in the competition for the bus in the seventh step, and thereafter, checking the abnormality of the response transmission state, and if the result is normal, performing the transmission operation of the data by initializing the hold status register and media analyzer.

BRIEF DESCRIPTION OF THE DRAWINGS

For fuller understanding of the nature and objects of the invention, reference should be had to the following detailed description taken in conjunction with the accompanying drawings in which.

DETAILED DESCRIPTION OF THE INVENTION

Figure 1:
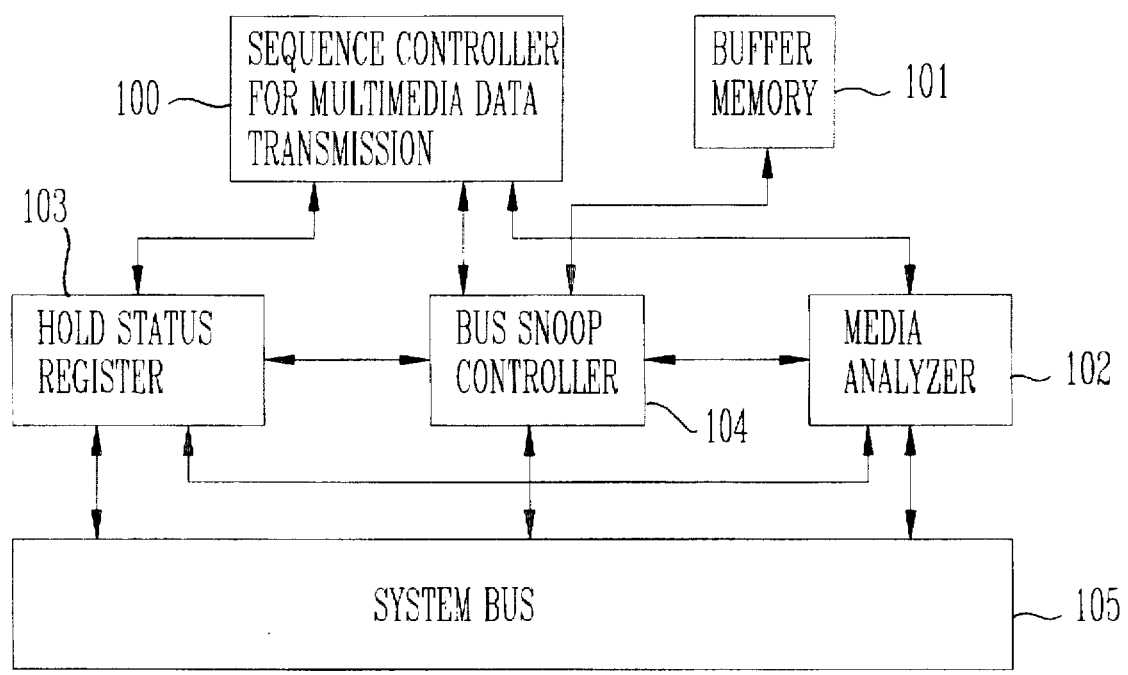
FIG. 1 is a schematic block diagram showing a data transmission apparatus according to the present invention.

FIG. 1 is a block diagram showing a data transmission apparatus according to the present invention.

The data transmission apparatus is composed of a sequence controller for multimedia data transmission 100, a buffer memory 101, a media analyzer 102, a hold status register 103 and a bus snoop controller 104.

The bus snoop controller 104 discriminates the copy or latch of the data on the system bus 105 and transmits the data to a bus data driver, and the media analyzer 102 discriminates whether the data pertains the media associated with the corresponding processor.

The hold status register 103 indicates whether the data discriminated to be pertained to the associated media is buffered in an effective condition, and the buffer memory 101 is a temporary storage for buffering the data ready for the copy or transmission.

The sequence controller for multimedia data transmission 100 controls the status transition and the operation of the bus snoop controller 104, the media analyzer 102, the hold status register 103 according to the size of the operation cycle of the peripheral functional blocks and the system bus 105.

Figure 2:
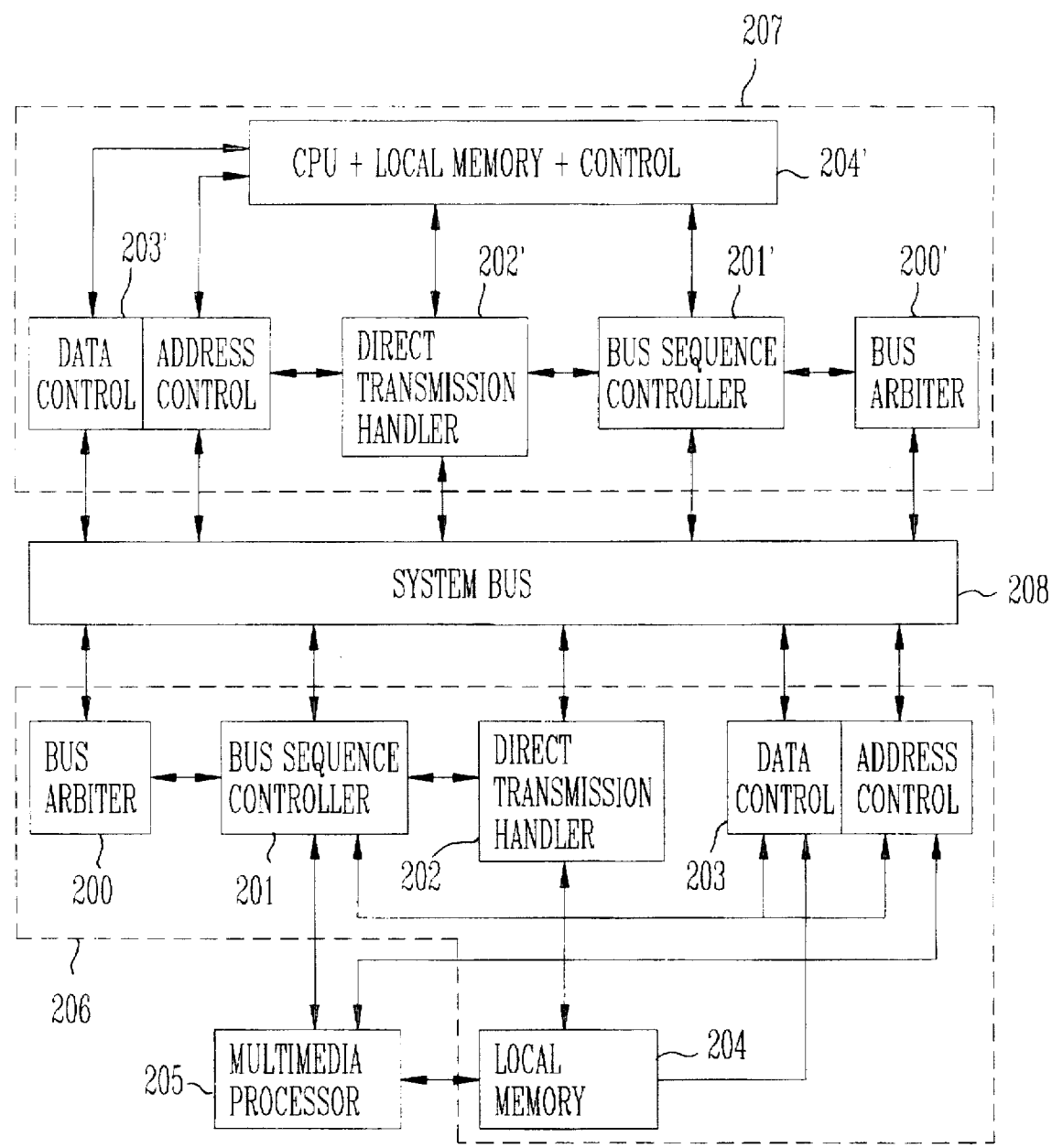
FIG. 2 is a block diagram showing the interrelation between the transmission apparatus of the present invention and peripheral functional blocks.

FIG. 2 is a block diagram showing the interrelation between the transmission apparatus of the present invention and peripheral functional blocks, which is composed of a multimedia processor or a communication network interface portion 206 composed of a bus arbiter 200, a bus sequence controller 201, a direct transmission controller 202, a data and address control 203, and a local memory 204; a multimedia processor 205 or a communication network processor; a main instruction processor portion 207 composed of a CPU+local memory+control block 204', a data and address control 203', a direct transmission handler 202', a bus arbiter 200', and a bus sequence controller 201'; and a bus system 208.

The multimedia data processor 205 or a communication network data processor portion drives the data processed at the multimedia data processor or communication network processor to the system bus 208 through the data and address control 203 when the bus sequence controller 201 reflects the information of the bus arbiter 200 and direct transmission controller 202 according to the specification of the operation of the system bus, or latches the data on the system bus 208 to the multimedia data processor or communication network data processor in the same way and processes the data.

The operation related to the direct data transmission of the main instruction processor portion 207 discriminated the use and method of use of the data stored in the memory device under the support of the media selection software at CPU+local memory+control block 204' and transmits the information to the multimedia processor block through the direct transmission controller 202'.

The instructions which is performed by the multimedia processor in connection with the direct data transmission are synthesis, connection and separation, etc.

The synthesis instruction performs the function of mixing several data stored in the local memory 204 into one data, and the connection instruction performs the operation of combining various types of data stored in the local memory 204 into one structural data in accordance with the synchronization.

In addition, the separation function performs the operations of separating the connected data transmitted and predating the transmission to the corresponding device.

Figure 3:
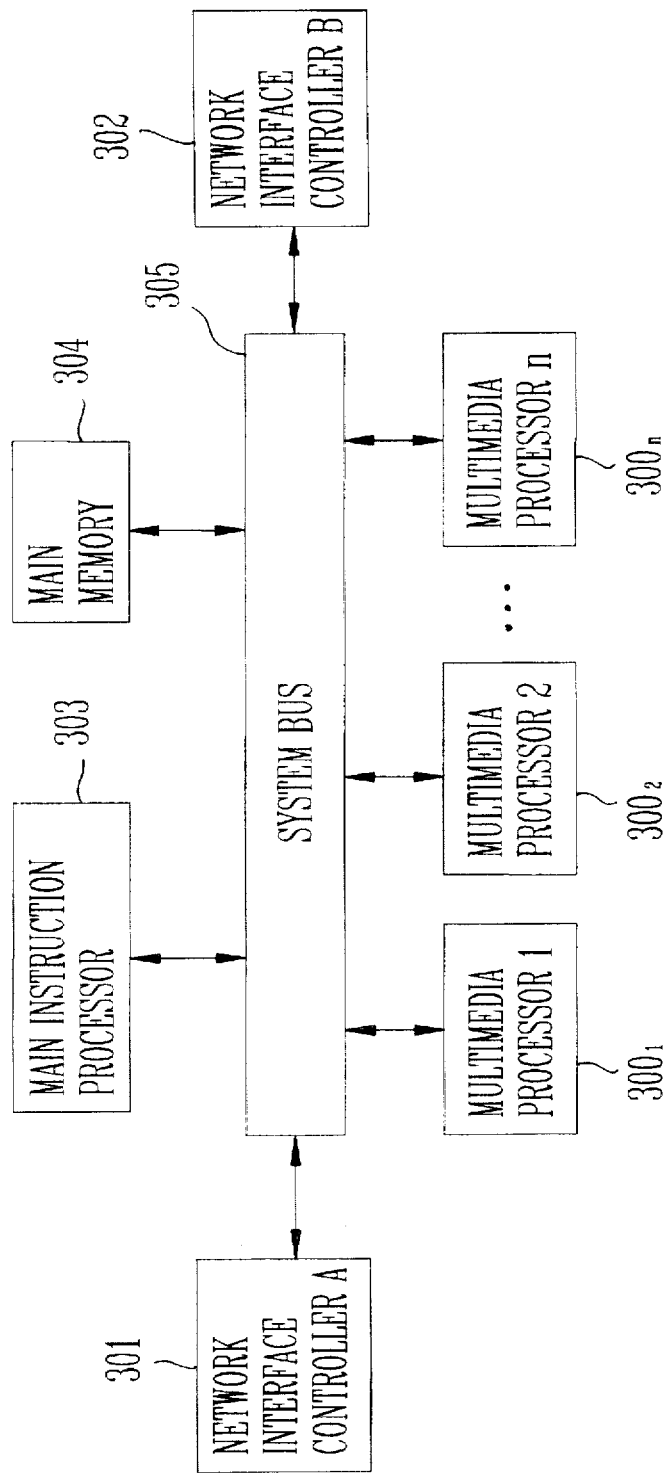
FIG. 3 is a block diagram showing a system composed of a plurality of processors of the present invention and communication network interfaces.

FIG. 3 is a block diagram of a computer system composed of a plurality of multimedia processors and communication network interface controller. The computer system is composed of the number of a multimedia processors $300_1$ to $300_n$, more than 2 communication network interface controller 301 and 302, main instruction processor 303, main memory device 304 and system bus 305.

The system of a plurality of multimedia processors and communication network interface controller constructed as described above has advantages in 3 aspects in the decrease of delay time in bus use, the reduction by half of the number of bus use due to the reduction of load of bus, and the gain in time due to no use of the main memory device 304.

That is, comparing the cases, where the multimedia data if the size of 1 multiple of system bus data bit is transmitted from the communication network interface controller A 301 to multimedia processor 1 $300_1$, from the communication network interface controller B 302 to multimedia processor 2 $300_2$, and from the main memory device 304 to multimedia processor 1 $300_n$, with the general processing method, the communication network interface controllers A 301, B 302 each used the bus 305 once to access the main memory device 304 and the main memory device 304 uses the bus 305 three times in case of general processing method, and since the internal operation period requires more than 2 bus cycles for storage of data in the main memory device in the former case, the total time required is 9 bus cycles.

However, in case of the present invention, the communication network interface controllers A 301, B 302 each uses the bus once and the main memory device 304 uses the bus 305 once so that total 3 bus cycles are required and although the number of bus uses is reduced to the ratio of 5:3, total service completion time is reduced to the ratio of 9:3 so that not only the load of bus is reduced but also the total processing time is reduced.

Figure 4:
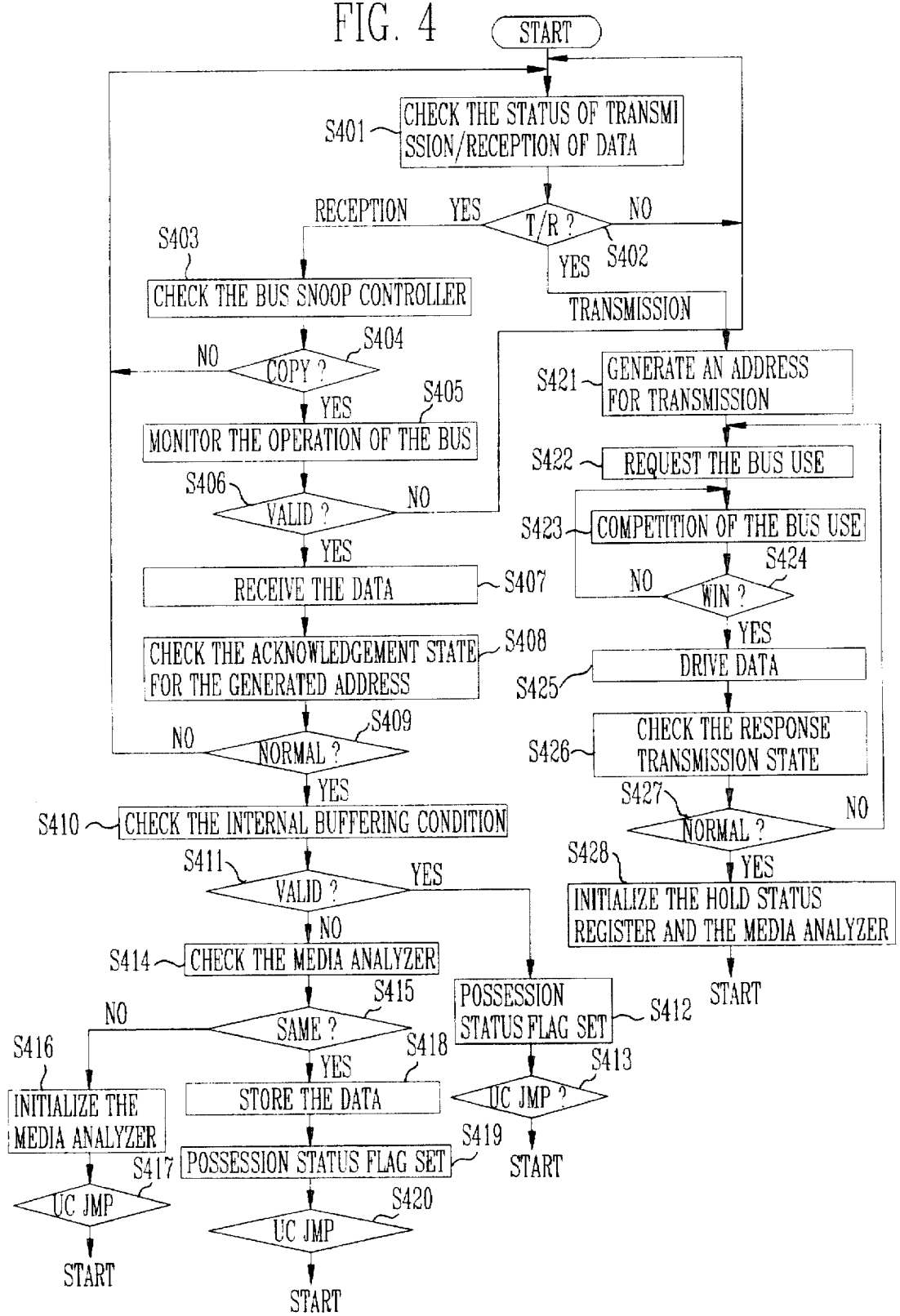
FIG. 4 is a flow chart to illustrate the control of the data transmission apparatus of the present invention.

FIG. 4 is control flow diagram of a case where the multimedia data sent from the communication network interface controller is directly latched to the multimedia data processor and of a case where the multimedia data is directly sent from the multimedia data processor to the communication network interface controller and shows the internal operation condition of the direct transmission controller and the direct transmission process of the multimedia data.

While the direct transmission controller(DTC) repeatedly checks the status of transmission or reception of the data (S401), it starts the receiving operation if the state is the data receiving state and starts the transmission operation if the state is transmission state, and continues the transmission/receiving state check if the stat is neither the receiving state nor the transmission state(S402).

In case of data receiving state in the step S402, the bus snoop controller is checked(S403) and it is checked whether it is copy enable state or not(S404), and if it is not the copy enable state, the transmission/receiving state check is continued, and if it is the copy enable state, the data on the bus is read in(S405).

In continuation, the valid or invalid state of bus operation is checked(S406) and if it is invalid state, it returns back to transmission/receiving check and if it is valid state, and if it is valid state, the data is received (S407).

The bus snoop controller checks the acknowledgement state for the generated address from the main acknowledging watching of the data received from the step S407(S408), and the acknowledgement state is checked(S409), and if it is abnormal, the DTC returns to the beginning state, and if it is normal, the internal buffering condition is checked(S410).

The DTC decides whether the internal status of the multimedia data processor board including the DTC is valid for buffering data on the basis of the state known by investigating at the step S410(S411). If it is invalid, the DTC makes the possession status flag non-possessive(S412), then it returns to the beginning, and if it is valid, the DTC checks the media analyzer(S414) and decides whether the media data is same kind or not(S415).

If the DTC decides that the media is not the same kind as the DTC expected in the step S415, then the media analyzer is initialized(S416), and the DTC state machine returns to the beginning state(S417), and if the DTC decides that the media is the same kind as the DTC expected, the DTC stores the data received from the system bus into the buffer memory (S418), and makes the hold status register possessive(S419), and then returns to the transmission/receiving check state(S420).

Thereafter, although not shown, if the multimedia processor receives the information about the availability of the data currently stored in the local memory from the direct transmission controller, the multimedia processor waits for the instruction of operation to be directly applied only to the available data.

The CPU+local memory+control block again transmits to the multimedia processor the instruction to be applied to the data currently stored according to the request by the application program, and the multimedia processor having received the instruction performs the functions related to the direct data transmission such as the synthesis, connection and separation of data and main functions such as restoration and compression, etc.

In continuation, if the bus state is a data transmitting state in the step S402, the DTC prepares the data to be transferred in the reverse order of the operation for receiving data and generates an address for transmission(S421), then requests the bus use through the bus arbiter(S422), and enters into the bus competition state.

The DTC discriminates the win or lose in the bus use competition(S424), and if the DTC loses, it enters into the bus competition state again, and if the DTC wins, it drives data on the system bus(S425), thereafter the DTC checks the response transmission state(S426) and discriminates the abnormality(S427).

If the result of response transmission check is abnormal in the step S427, the DTC returns to a bus requesting state again, and if the result is normal, the DTC initialized the hold status register and the media analyzer(S428) and returns to the initial state.

If the above described procedure is completed, the multimedia data is directly transmitted from the communication network interface controller to the multimedia data processor, and vice versa, without passing through the main memory device.

As described above, the present invention has an effect of reducing the load of the system bus since the data is directly transmitted between the multimedia data processor and the communication network interface controller through the system bus without separate data transmission path.

What is claimed is:

1. An apparatus for data transmission between a communication network interface and multimedia data processor in a computer system in which a communication network interface, multimedia processor, main memory device and main instruction processor exchange informations by means of a system bus, said apparatus comprising:

a hold status register for discriminating whether the data can be received from said system bus;

a media analyzer for discriminating whether a media of said received data is correct;

a bus snoop controller for generating an acknowledgement signal for receiving the data from said bus on the discriminated information of said hold status register and media analyzer; and a sequence controller for multimedia data transmission for controlling the operation of said hold status register, media analyzer and bus snoop controller; and wherein said system bus is a single system bus.

2. The apparatus of claim 1, further comprising a buffer memory for temporarily storing the data to be received from or transmitted to said system bus.

3. The apparatus of claim 2, wherein the operation of said buffer memory is controlled by said sequence controller for multimedia data transmission.

4. A method for direct data transmission between a communication network interface and multimedia data processor, comprising the steps of:

a first step of stating a receiving operation if a state is a data receiving state and starting a transmission operation if the state is a transmission state based on a result of check of the state of transmission or receiving of data checked by a direct transmission controller(DTC) of said multimedia data processor;

a second step of reading the data on said bus if the data is available for copying, based on a result of check of a bus snoop controller according to the start of said data receiving operation of said first step;

a third step of receiving the data if the operation of said bus is valid, based on a result for check of the operation state of said system bus, in succession of the performance of said second step;

a fourth step of discriminating by a media analyzer whether the corresponding media is same kind when the internal buffering is possible when there is no abnormality, based on a result of check of abnormality of said receiving sate of the data in said third step;

a fifth step of initializing said media analyzer if the corresponding media is not same kind in said fourth step, storing the received data to a buffer memory and performing the receiving operation of the data by making a hole status register possessive if the corresponding media is same kind;

a sixth step of preparing the data to be transmitted and generation an address for transmission according to the start of transmission operation of the data in said first step;

a seventh step of requesting a use and competing for said bus use, in succession of the performance of said sixth step; and an eighth step of driving the data to said bus if said DTC wins in the competition for said bus use in said seventh step, and thereafter, checking the abnormality of the response transmission state, and if the result is normal, performing the transmission operation of the data by initializing said hold status register and media analyzer; and wherein the data can be directly transmitted through said single bus without passing through a main memory device between said communication network interface and multimedia data processor.

\* \* \* \* \*